U S 0 0 6 0 1 7 2 1 8 A

United States Patent [19]

Bright

[11] Patent Number: 6,017,218

[45] Date of Patent: Jan. 25, 2000

[54] BRUSH MARK ANALYSIS METHOD FOR PAINTING AUTHENTICATION

[76] Inventor: Thomas J. Bright, 1152 No. La Cienega Bl., West Hollywood, Calif. 90069

[21] Appl. No.: 08/763,531

[22] Filed: Dec. 12, 1996

[51] Int. Cl.[7] .................................................. G09B 11/00
[52] U.S. Cl. ............................................ 434/84; 434/155
[58] Field of Search ....................................... 434/84, 155

[56] References Cited

U.S. PATENT DOCUMENTS

| 5,243,405 | 9/1993 | Tichenor et al. | 356/371 |
| 5,382,233 | 1/1995 | Brotz | 434/84 |
| 5,521,815 | 5/1996 | Rose, Jr. | 364/409 |
| 5,521,984 | 5/1996 | Denenberg et al. | 382/209 |
| 5,583,950 | 12/1996 | Prokowski | 382/212 |

*Primary Examiner*—Paul J. Hirsch
*Attorney, Agent, or Firm*—Lawrence S. Cohen

[57] ABSTRACT

A method for authenticating a subject painting as to a particular artist by comparing brush marks between one or more known works of the artist and the subject painting.

13 Claims, 5 Drawing Sheets

BRUSH MARK ANALYSIS METHOD FOR PAINTING AUTHENTICATION

FIELD OF THE INVENTION

The invention relates to a method for identifying the artist who has painted a picture by matching brush marks on a subject painting of questioned authenticity with the brush marks on a painting of confirmed authenticity.

BACKGROUND

It has long been a problem in the art world to authenticate paintings or other works of art. Such authentication is often desired when a painting is not signed, although it also may apply when the painting bears a signature. Such authentication is typically based on the opinion of an expert. Numerous elements are included in evaluation by an expert. These are typically subjective determinations by the expert, drawing on the expert's experience and other background. Exemplary areas for evaluation by experts is the painting subject matter, and the general style or technique employed. Analysis by an expert may also include study of how the paint is laid down on the canvas, such as whether the paint is thick or thin also including study of the brush stroke technique.

Consequently, these means for evaluating paintings for authenticity are almost exclusively dependent on the subjective judgement of experts. There has been little or no truly objective technique for judging the authenticity of a painting. The only objective techniques known to this inventor are evaluation of age of a painting as to which there is some scientific methodology and analysis of paint composition. But age determination gives only a very wide range of estimates. Analysis of paint composition can be useful; but, paint composition analysis, like age is not artist specific. The present invention contributes a novel and objective method for evaluating authenticity of a painting which is specific to the particular artist.

SUMMARY OF THE INVENTION

The invention lies in the discovery that brush marks can provide a means for authentication by reason of the artist's brush creating a unique signature. The invention is a method for optical identification of an artist's brush marks by brush mark comparison. The method involves selection of a brush mark on a known painting by the artist and identification of that brush mark on a painting under study. In a preferred implementation the method involves creation of an image of the brush mark found on the known genuine painting and comparing that brush mark with those on the subject painting under investigation by aligning an image of a confirmed brush mark on the painting under study, or on an image of the painting under study. The process can be reversed so that a brush mark on the painting under study is imaged and compared with that on the known work. In fact, in most applications an image of both paintings will be used.

An important aspect of the method is that a brush mark selected from the known work appears numerous times in the work. This ensures that the brush mark is indeed a signature of a particular brush as distinguished from a occasional untypical brush mark. Similarly, the brush mark selected for study, on the work under investigation must appear repeatedly. Also, in the method, the comparison process is implemented by establishing edge access to the brush mark of the known work and aligning it with the mark under investigation. This is done by cutting the image of the brush mark across its width at a selected point.

Also, brush marks of an artist, either from a single work or from an entire body of work, can be used to create a data base, which can be digitized and then used by way of display to be available for comparison to an image of a subject painting.

DETAILED DESCRIPTION

Figure 1:
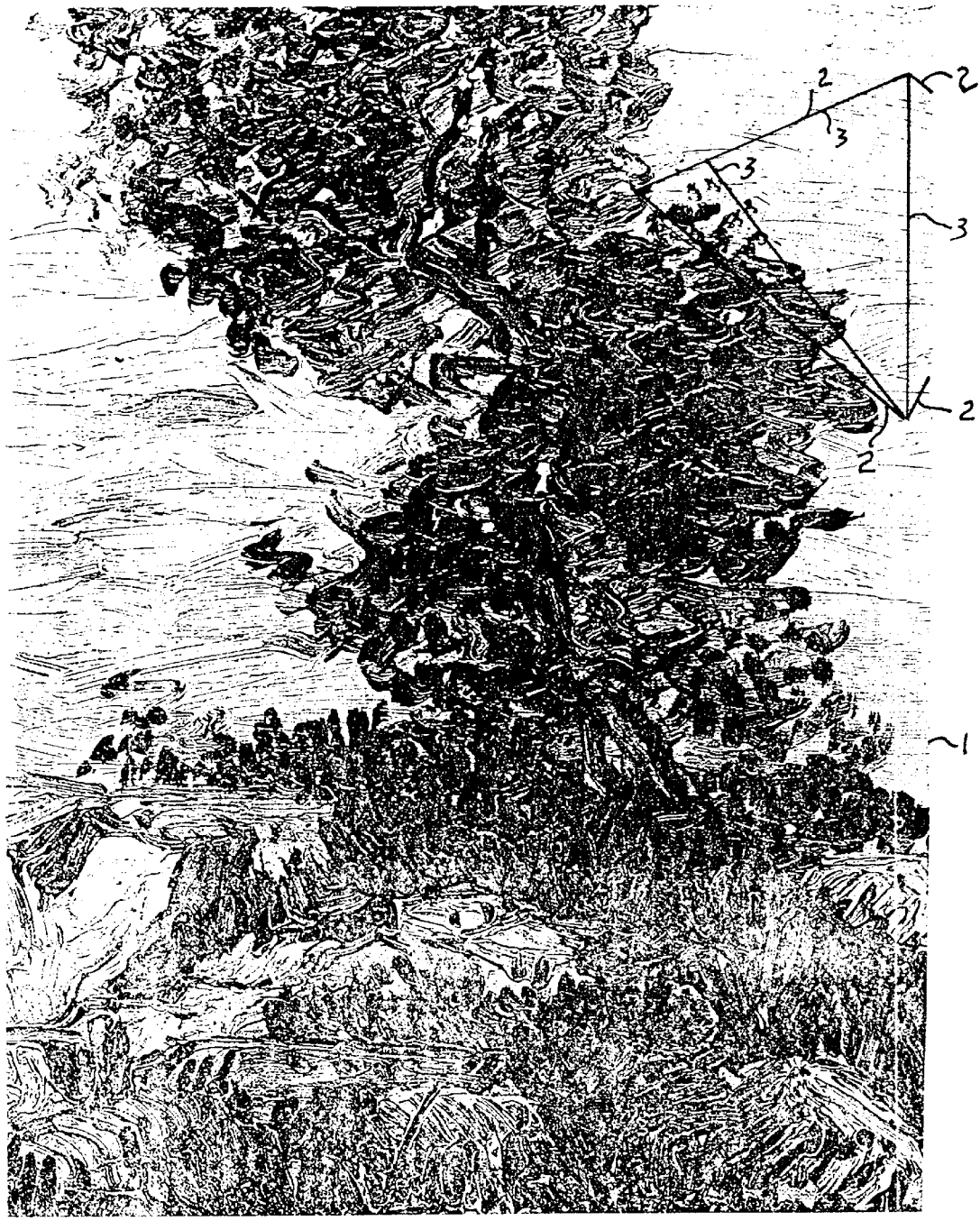
FIG. 1 is a known painting by Van Gogh, known as Rock With Oak Tree Painted in 1888.

An artist can have a distinctive brush stroke which is often used by experts to evaluate a painting for authenticity. Brush stroke technique is different from brush marks which are the subject of the present invention. It has been discovered that generally, the brush mark that is left by a brush stays with that brush during its entire lifetime in use and leaves a mark consisting of a set of visible streaks or striations, being consistently repeating during use. Thus, brush marks are the tracks left by imprint of the artist's brush in the paint as the painting is created. It has been discovered that each brush has a unique brush mark which defines its signature.

Thus, the premise of the invention is that an artist uses a particular brush over an extended period of time and therefore, a brush mark may be found on paintings over a period of time representing the use of the brush.

The unique signature of brush marks appear to be derived from a number of variables. One set of variables is the material and manufacturing technique of the brush. For example, brushes may be made of sable, boar bristle or other materials. They may be finished in round, flat or fanned shape. Sometimes a brush has a perceivable flaw. Further, brush marks differ by reason of how they are used. For example, the angle and pressure used by the artist will participate in establishing the brush mark's signature. However, at any particular angular position the brush mark will be consistent through the lifetime use of the brush. Also, the type and viscosity of paint will contribute to the brush mark signature; but again the brush mark will be consistent for the same type of paint. Further, the accumulation of paint on and between the bristles will contribute to the brush mark signature. A brush may have a noticeable flaw. Consequently on each brush mark there are several key elements which are part of the brush mark signature. Most commonly, the brush mark will appear as a set of streaks whose depth, number and spacing establish the unique signature. The present invention does not depend however, on a flaw, or other peculiar characteristic; it works for a brush having no apparent peculiarity.

The brush mark characteristics are defined as ridges, which are high, and rills which are low. As will be seen the number of brush mark features on the painting under study which match with the known brush mark is important to the inventive method. Each one of a ridge and a rill is counted as a separate identifying characteristic or point of match. Sometimes a brush mark will have one or more highly definitive features, or a set of them spaced apart to be in combination a highly definitive characteristic. A set of features for example two deep rills spaced a specific distance apart constitute a countable feature even though the rills themselves also each count as a feature. It is considered that in order to establish a authenticity for a painting, 12 characteristics or features must match. Also, the points of match should be spread across the width of the brush stroke, as distinguished from being clustered only in one area.

Not every brush mark on a painting is suitable for authentication purposes. In order to implement the use of this discovery as a method for establishing authenticity of a painting under investigation (referred to as a subject painting) the basic procedure is to identify a brush mark which is seen repeatedly on one or more known works by the artist. Then the subject work is searched for that brush mark. Once a presumptive brush mark is found on the subject painting a rigorous comparison is undertaken. If the brush mark on the subject work passes the vigorous comparison, then authenticity can be concluded.

The process can be reversed. That is, the subject work is first searched for a repeated brush mark and then the known work is examined for repeated presence of that brush mark.

Identification of a repeated brush mark on the known work is done by an intuitive identification, although it is preferred to find at least 5–6 characteristics. This could be done by a more rigorous procedure but this is not usually necessary because it is usual that an area of a painting, such as one color area was done by a single brush and will contain numerous easily seen repetitions of a brush stroke. Consequently the selected brush stroke will be easily picked out. Even so, many different brush marks are made by a single brush and it is necessary to find a mark which appears repeatedly on the known work. When more than one brush stroke is available for selection, it is best to select one which has one or more distinctive features, if possible.

After identification of the brush mark on the known work (the known brush mark) which will be used, the comparison process is implemented. In the preferred implementation, first an image of the known brush mark is created. This is typically a photograph and often then a photocopy of the photograph. High contrast between ridges and rills being desirable, the photograph should be made under raking light which will emphasize the distinction, rendering the ridges light and the rills dark. The image is preferably created at actual size. In order to provide accurate visual comparison a point across the brush mark is selected and the image is cut or otherwise prepared to have that point at the edge of the image. This is called edge access. Next the image is placed adjacent or on a brush mark which has been selected on the painting under investigation, (study brush mark) aligning the edge accessed mark with the painting mark. The study brush mark must also be one which appears repeatedly in the painting under investigation. Finally, the closeness of match is evaluated by counting the points of match.

More, succinctly, the preferred steps of the method are:
1. Refer to a known painting by the artist in question. Pick a sample area with very legible, strong, clear, brush mark imprints and look for repeats. Longer brush marks are better as the features can be seen over more territory. An area of the painting seen in one color is desirable and lighter colors produce better images for use.
2. Produce an image of one brush mark of the selected group (known brush mark), which has a clear preferably straight length. This preferably starts with a photograph, preferably made under raking light to emphasize the ridges and rills. Print the image as nearly as possible at exact actual size. Then make a good photocopy of it. This will be the image used in the comparison.
3. Prepare the image to give edge access to the brush mark. This typically will involve cutting the image so that the desired brush mark attributes are at the edge of the cut.
4. Search the painting under investigation for repeated brush marks. Select one (study brush mark) for study.
5. Prepare an image of the study brush mark. This step can be skipped if the comparison is going to be made directly on the subject painting. But there is often an advantage to using an image of the subject painting in that the two images can be on thin material which facilitates the comparison step. Prepare an image of at least a portion of the painting in question which has the study brush mark selected for comparison. This preparation is done by producing a photocopy of a photograph as described above sometimes an X-ray will be useful. This should also be done at exact actual size so that the comparison is of images of the same scale. If other than actual size is used, such as a magnification, they must be the same.
6. Align the known brush marks at the edge of the known image to the selected brush mark on the study image.
7. Evaluate the closeness of match by identifying and counting the points of match. A minimum of 12 points of match are necessary in order to establish brush mark authenticity. It is preferable to count all the points of match over the entire brush mark even if more than 12 are found. While 12 is the minimum, more points of match increase the likelihood of acceptability of the conclusion.

Through this technique a person may objectively determine brush mark match between the known painting and the subject painting.

As noted above, a critical element of the method is that the brush mark selected for imaging must be one which is seen to be repeated in the known painting. Therefore, in the steps recited above, it is important to select a brush mark which is seen to be repeated in a known painting or in a number of known paintings and to prepare the image and edge access of the image of that particular brush mark. An occasional or unique brush mark which is not seen to be repeated would not be as useful a source of a valid comparison for purposes of authenticity. Of course this is a matter of degree which effects the acceptability of the conclusion. An exception to this rule would be a brush mark of extreme distinctiveness, which although not found highly repeated on a work is found at least with some repeatedness.

In another implementation the first step would be to establish a data base of brush marks from known works of selected artists. Of course creating the data base would extend over a long period of time and it is sufficient to observe that the data base can then be accessed by persons desiring to use the technique. The data base can be created by any number of imaging techniques and stored in a digital storage system so that it can be reproduced by hard copy or by display on a screen and can be transmitted from place to place. Thus, the technique of comparing brush marks can be facilitated. The brush marks from a subject painting can be digitized and compared on a display and transmitted from place to place as well. Most importantly through digital comparison techniques comparison may be facilitated.

A further aspect of the present invention is that in selecting the known brush mark it is analyzed to identify, any highly definitive characteristics. For example, a large space between bristles located at a particular place along the width of a brush; or a drop of dried paint causing a rut at a particular place in the brush mark, or the ends of the bristles having a particular outline, or the unique streak reflecting bristle spacings such as two or three very deep rills. Therefore, sometimes a specific set of such characteristics can be defined. Further, then a two step elimination process can be defined. First, the subject work brush mark is examined to see if it has one of the prominent, or primary brush mark characteristics. If so, the data base search is limited to those having the same primary characteristic. These are identified for more complete study, while those lacking the primary characteristics can be ignored. Then the matching process goes to the second stage of precise rigorous comparison.

This gives rise to a further technique in creating the data base referred to above, which is to image, record and store brush marks on a painting or body or work along with information respecting the observed repeatedness of such brush marks. For example, a brush mark which is extremely repeated on a painting or body of work may be designated as such, while a brush mark which is seen only once or a few times would also be recorded on that basis. The highly distinctive mark may also be defined. This then would enhance the utility of a data base by providing information for repeatedness of a brush mark.

In the methods discussed above the creation of the image of the known work and providing it with edge access for comparison with the subject work can be reversed. That is an image of a brush mark on a subject work can be edge access prepared and then the image compared with the known work preferably an image of the known work.

An alternative to edge access comparison is direct overlay comparison using a transparent film of x-ray or optical image. Also, in the digital mode, screen displays can be used when both the authentic and the subject brush marks are digitized.

In the art world, as elsewhere, an authenticity conclusion is as respected as the person issuing the conclusion. This is not likely to change with adoption of the present technique. Therefore it is expected that a respected expert will use the present method, performing it himself or having it performed by someone who is also respected for use of this method, as one element in the authentication process.

FIG. 1 shows a known painting 1 by Van Gogh known as Rock With Oak Tree, painted in 1888. The portions 2 and 3 are identified for further reference.

Figure 2:
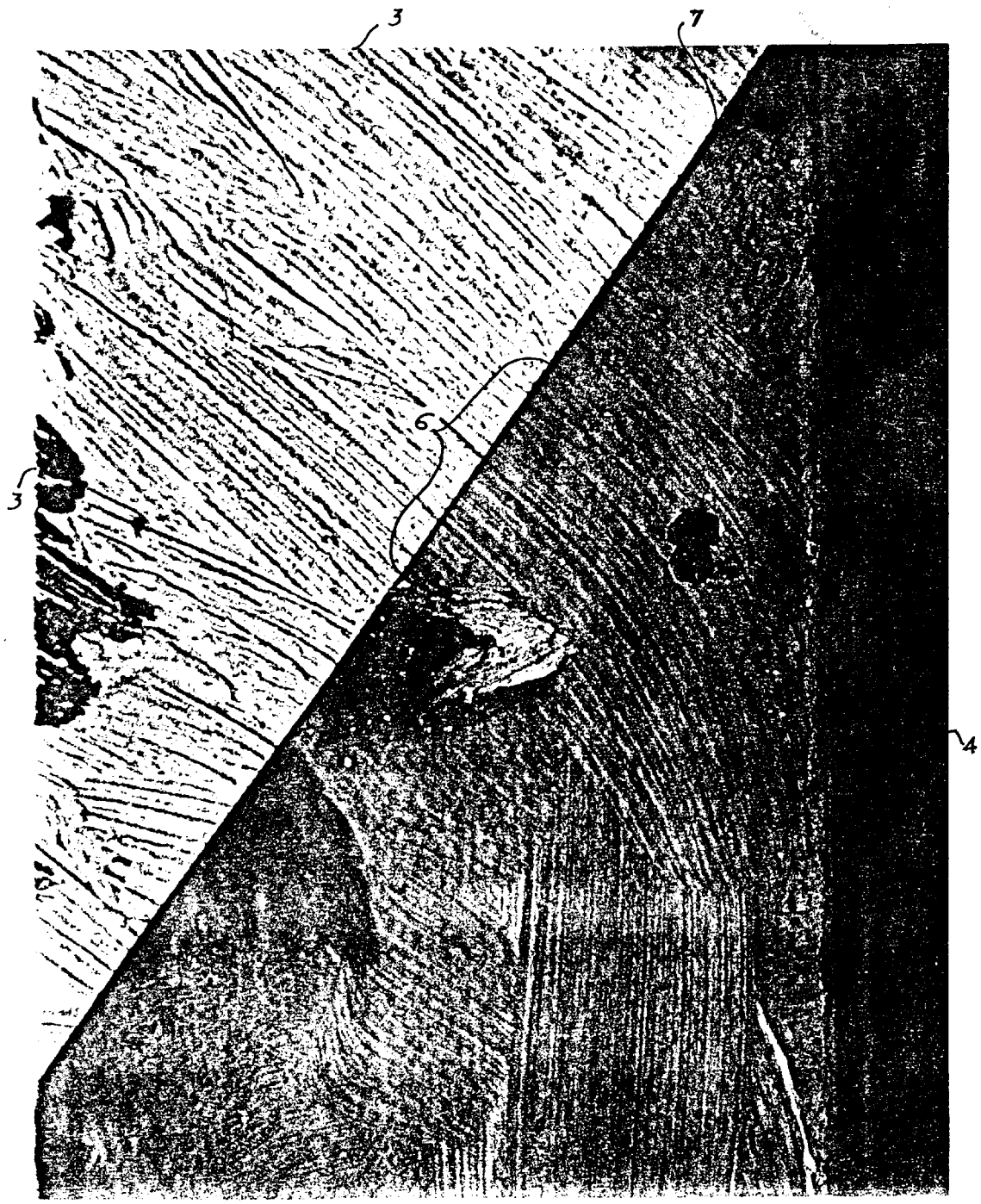
FIG. 2 is a portion of Rock With Oak Tree and a portion of another known Van Gogh known as Yellow Roses.

FIG. 2 is the portion 3 of Rock With Oak Tree as seen in FIG. 1 and a portion 4 of another known Van Gogh known as Yellow Roses. Upon study of Rock With Oak Tree, a brush mark has been found as partially seen at 6. Reproduced by photographing it in raking light, the portion 3 of Rock With Oak Tree has been enhanced due to the effect of the raking light to show the ridges as light streaks and the rills as dark streaks. It is preferable, as in this case, that the photograph of Rock With Oak Tree has been photocopied. Then at a selected place where the selected brush mark features are clear, the image is edge accessed by cutting it at line 7. The process proceeds; to align the edge accessed brush mark onto a selected study brush mark on the painting under investigation (or an image of it) until a presumptive match is found. In the case of FIG. 2, the painting under investigation is also a known Van Gogh of 1888, Yellow Roses. Although, the match seems clear to an observer by reason of several apparent points of match, authenticity is not established unless at least 12 points of match are found. The study brush mark on the subject painting is one which is seen repeatedly.

Figure 3:
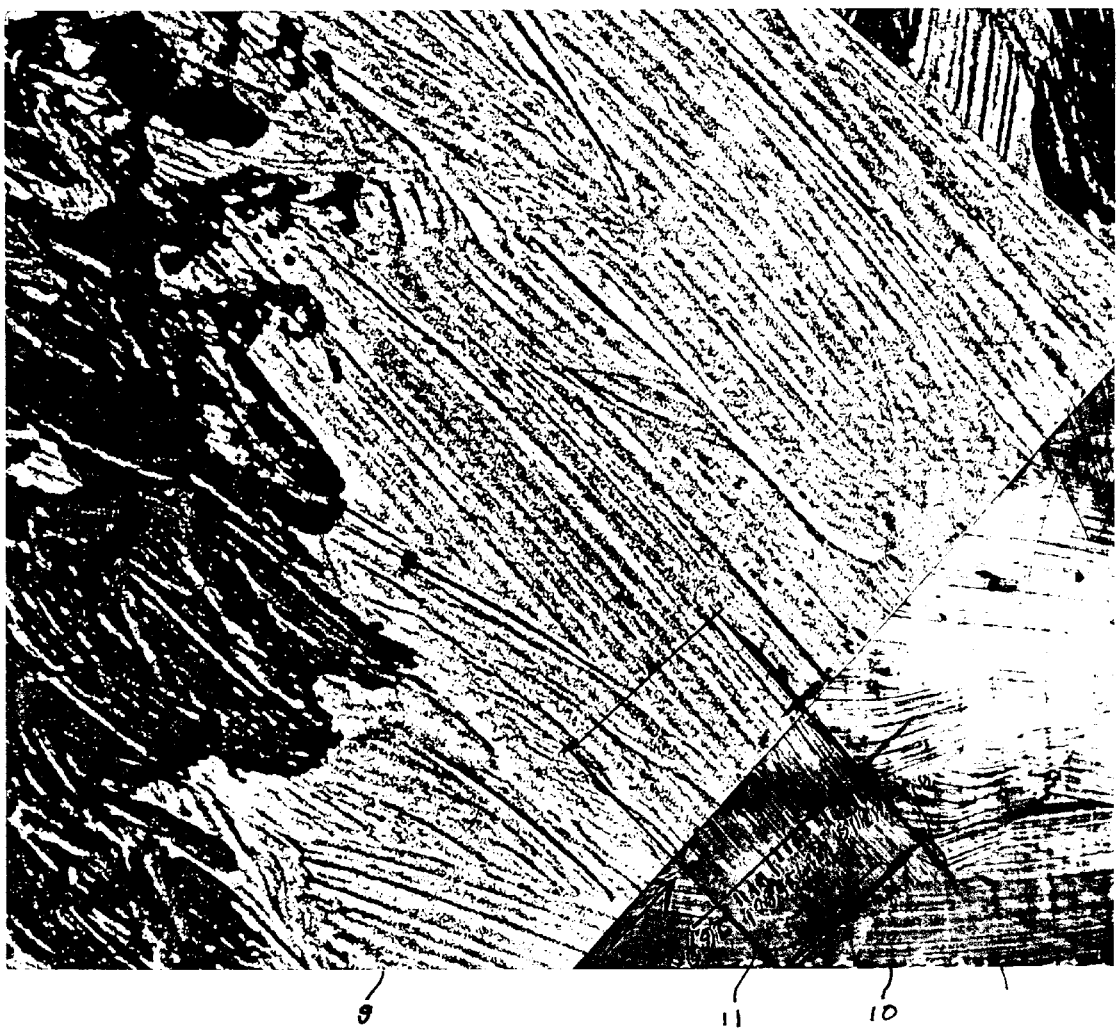
FIG. 3 is a portion of Rock With Oak Tree and an X-ray of a painting under investigation, known as Sunflower And Oleander.

FIG. 3 is a portion 9 of Rock With Oak Tree, in the form described above generally in the area 2 and a portion 10 of an X-ray of a painting under investigation known as Sunflower and Oleander. The X-ray has been photocopied to facilitate its use. Some of it lies under portion 9. The brush marks of portion 10 are under-painting revealed by the X-ray. After alignment, the comparison step proceeds with a rigorous identification and counting of points of match. Portion 11 is outlined to show this. The points of match have been counted and marked. In this case 26 points of match have been found. Therefore, it is considered that authenticity is established insofar as this method would be accepted.

Figure 4:
FIG. 4 is another portion of Rock With Oak Tree another X-ray portion of the painting under investigation, known as Sunflower And Oleander.

FIG. 4 shows the same general area 12 of Rock With Oak Tree as described above and a different portion 13 of Sunflower and Oleander. In this case portion 14 is outlined to show the area of rigorous examination. In this case, 23 points of match have been found, thereby establishing authenticity.

It is noted that all of the area of Rock With Oak Tree under discussion here (the light area) was done with the same brush and the brush mark used in the above comparisons is seen repeatedly in that area. Similarly the portion 13 of Sunflower and Oleander also was done with the same brush and the brush mark selected for examination is seen repeatedly. But not all of the brush marks in either case look the same. This is because of variations in how the brush is held, how it is passed over the canvas (or other base), how thick the paint is, and other variables. But, it is clear from this method that the brush that did the selected area of Rock With Oak Tree is the same brush that did the area of Sunflower And Oleander.

As noted above, the standard for establishing repeatedness is not as rigorous as that used for the comparison step because it is already understood that the same brush is used for an area of a painting.

Referring again to FIG. 2, this comparison is of two known paintings and is used to demonstrate validity of the method.

Figure 5:
FIG. 5 is a portion of Rock With Oak Tree, an X-ray portion of Sunflower And Oleander, and a known Van Gogh self portrait.

Referring to FIG. 5, there is shown an implementation defined as -double match- in which a study brush mark is matched with two known paintings. In this case portion 14 is a known Van Gogh self portrait. Portion 15 is from Rock With Oak Tree. Portion 16 is an X-ray portion of the subject painting, Sunflower And Oleander. Portions 15 and 16 are the same images as used in FIG. 4, which gave 23 points of match. In this case the comparison step shows 26 points of match of Sunflower And Oleander to the Self Portrait. Therefore, this double match implementation, giving a total of 49 total points of match, gives enhanced authority to the conclusion of authenticity.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A method for aiding in the authentication of a subject painting by brush mark comparison with one or more authenticated paintings of an artist comprising;

selecting for comparison a brush mark on one or more authenticated paintings thereby defining an authenticated brush mark; and selecting a brush mark for study on the subject painting thereby defining a study brush mark;

comparing the authenticated brush mark with the study brush mark; and evaluating the closeness of match.

2. The method of claim 1 further comprising;

creating an image of the authenticated brush mark; and comparing by placing the image in close juxtaposition to the study brush mark with brush mark features aligned.

3. The method of claim 2 further comprising;

preparing the image of the authenticated brush mark for edge access of the authenticated brush mark; and comparing by aligning the edge accessed brush mark features on the image of the authenticated brush mark with selected brush mark features on the study brush mark.

4. The method of claim 2 wherein there is also created an image of the study brush mark and the comparing step is aligning the edge accessed brush mark features on the image of the authenticated brush mark with the brush mark features on the image of the study brush mark.

5. The method of claim 1 wherein the authenticated brush mark is selected due to repeated appearance on the one or more authenticated paintings.

6. The method of claim 5 wherein the study brush mark is selected due to repeated appearance on the subject painting.

7. The method of claim 6 wherein the step of evaluating closeness of match comprises counting match points.

8. The method of claim 7 further comprising a conclusion of authenticity if there are 12 or more match points.

9. A method for aiding in the authentication of a subject painting by brush mark comparison with an authenticated painting of the artist comprising;

selecting a brush mark on the subject painting for study;

providing an image of the selected brush mark;

preparing the image for edge access of the selected brush mark;

selecting at least one brush mark on the authenticated painting for study;

aligning the edge access features on the image of the selected brush mark on the subject painting with the at least one brush mark on the authenticated painting;

evaluating the closeness of match.

10. The method of claim 9 wherein the study brush mark is selected due to repeated appearance of the brush mark on the subject painting and the brush mark on the authenticated painting is selected due to repeated appearance of the brush mark on the authenticated paintings.

11. A method for aiding in the study of artist authenticity of a subject painting by brush mark comparison comprising;

creating a data base of the artist's brush marks found repeatedly on authenticated paintings said data base being image available for each brush mark;

selecting at least one brush mark which appears repeatedly on subject painting for comparison;

producing an image of said at least one selected brush mark on the subject painting;

aligning the features of the subject pointing brush mark with a selected data base image; and evaluating the closeness of match.

12. The method of claim 11 wherein the brush marks in the data base are prioritized in categories selected from;

a. the order of repeatedness of the brush mark;

b. particular definitive features of the brush mark; or c. both a and b.

13. the method of claim 12 in which the subject brush mark is also digitized and then compared with the digitized authenticated brush marks by programmed identifying qualities in prioritized order.

* * * * *